(12) United States Patent
Ino et al.

(10) Patent No.: US 6,292,626 B1
(45) Date of Patent: Sep. 18, 2001

(54) REPRODUCING APPARATUS, RECORDING APPARATUS AND RECORDING/REPRODUCING APPARATUS

(75) Inventors: Hidefumi Ino; Tokuo Nakatani, both of Osaka; Toshio Kanai, Kyoto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/265,700

(22) Filed: Mar. 10, 1999

(30) Foreign Application Priority Data

Mar. 10, 1998 (JP) .................................................. 10-057809

(51) Int. Cl.$^7$ .................................................. H04N 5/781
(52) U.S. Cl. ........................ 386/125; 386/126; 711/112; 707/200; 369/32
(58) Field of Search ....................... 386/45–46, 125–126; 360/69; 711/112, 113, 114; 710/52; 707/200, 204; 369/30, 32, 34

(56) References Cited

U.S. PATENT DOCUMENTS

| | | | |
|---|---|---|---|
| 3,749,410 | * | 7/1973 | Britz ........................................ 360/69 |
| 5,257,111 | * | 10/1993 | Kakuyama ............................ 386/125 |
| 5,862,107 | * | 1/1999 | Goto ........................................ 363/32 |
| 5,944,768 | * | 8/1999 | Ito et al. ................................ 369/32 |

FOREIGN PATENT DOCUMENTS

| | | |
|---|---|---|
| 0 664 542 A1 | 7/1995 | (EP) . |
| 0 774 709 A2 | 5/1997 | (EP) . |
| 0 794 483 A2 | 9/1997 | (EP) . |
| 2 270 791 A | 3/1994 | (GB) . |

OTHER PUBLICATIONS

European Search Report date Nov. 18, 1999.
Patent Abstracts of Japan, vol. 1997, No. 9, Sep. 30, 1997 and JP 09 134586 A (Sony Corp.) May 20, 1997.

* cited by examiner

Primary Examiner—Wendy R. Garber
Assistant Examiner—Christopher Onuaku
(74) Attorney, Agent, or Firm—Eric J. Robinson; Nixon Peabody LLP

(57) ABSTRACT

A reproducing apparatus according to the present invention includes: a first storage including a changer for housing a plurality of storage media and a drive for reading out data from first and second target storage media selected from the storage media in that order; a second storage; a data processing unit for presenting the data stored on the first and second target storage media; and a controller for controlling the changer, the drive, the data processing unit and the second storage. Before the data processing unit starts to present the data stored on the first and second target storage media, the controller controls the first storage to read out at least part of the data stored on one of the first and second target storage media as bridging data and controls the second storage to store the read bridging data. When the data processing unit starts to present the data stored on the first and second target storage media, the controller controls the second storage to supply the bridging data to the data processing unit during a period in which reading the data stored on the first and second target storage media is discontinuous because of exchange of the first target storage medium for the second target storage medium, so as to present the data stored on the first and second target storage media continuously.

11 Claims, 10 Drawing Sheets

Fig. 2

ON-MEDIUM INFORMATION 60

<DISK ID>

DISK 1
1998-03-10-23-00-00

DISK 2
1998-03-12-20-00-00

DISK 3
1998-03-28-18-00-00

DISK 4
1998-04-05-20-30-00
......

DISK n

<FILE ID>
1998-03-10-23-00-00-00-01
1998-03-15-20-00-00-00-01-01
1998-03-12-20-00-00-00-01-10
1998-03-15-20-00-00-00-01-02

1998-03-15-20-00-00-01-01
 ―――――   ―――――  ――    ――
 RECORDING RECORDING CHANNEL ORDER OF
 DATE      START TIME NUMBER  RECORDING

REPRODUCING APPARATUS, RECORDING APPARATUS AND RECORDING/REPRODUCING APPARATUS

BACKGROUND OF THE INVENTION

The present invention generally relates to recording and reproduction of data, and more particularly relates to a technique of continuously recording and reproducing AV data in a system, like a disk changer, in which a plurality of storage media can be housed.

Various types of storage media, including hard disk, optical disk, floppy disk and semiconductor memory, have been used for storing digital data thereon. Among these media, an optical disk has been used most frequently as a medium for storing recyclable digital data thereon, because an optical disk is advantageous in portability and capacity. Also, in most cases, the data stored on such a storage medium has been of a small size, e.g., text data or still picture data on the order of several tens megabytes.

However, in recent years, the demand for a storage medium that can store data of a much greater size, like moving picture data on the order of several gigabytes, has been increasing day after day. In recording such an enormous quantity of data, however, a single storage medium can rarely meet the capacity required for recording the data entirely. The same is true of even a large-capacity storage medium such as a DVD-RAM.

For example, as for a laser disc (LD), if data cannot be recorded entirely on a single side thereof, then the data is separately recorded on both sides thereof to avoid the problem of insufficient capacity. On the other hand, a recording/reproducing apparatus using a disk changer compensates for the shortage of capacity by recording data on a plurality of disks.

Regarding text data or still picture data, the recording and reproducing operations thereof do not have to be performed in real time. Accordingly, there is no problem if such data is recorded on a plurality of disks separately so long as disks are exchanged every time data has been written on a single disk.

However, if moving picture data is recorded in real time on both sides of an LD or on a plurality of disks, then it is difficult to maintain satisfactory continuity for the data stored. Specifically, in reproducing data stored on different disks or different sides, it takes a rather long time to reverse the side to be reproduced from recto into verso or to exchange the disks to be reproduced. Accordingly, the reproduction of the data may be discontinued because such an operation of reversing the side or exchanging the disks should be performed. Similarly, in recording data on different disks or different sides, the supply of the data must be suspended while the side to be recorded is reversed from recto into vero so or while the disks to be recorded are exchanged.

SUMMARY OF THE INVENTION

An object of this invention is providing reproducing apparatus, recording apparatus and recording/reproducing apparatus allowing for continuous reproduction and recording of data from/on a plurality of storage media.

A reproducing apparatus according to the present invention includes: a first storage including a changer for housing a plurality of storage media and a drive for reading out data from first and second target storage media selected from the storage media in that order; a second storage; a data processing unit for presenting the data stored on the first and second target storage media; and a controller for controlling the changer, the drive, the data processing unit and the second storage. Before the data processing unit starts to present the data stored on the first and second target storage media, the controller controls the first storage to read out at least part of the data stored on one of the first and second target storage media as bridging data and controls the second storage to store the read bridging data. When the data processing unit starts to present the data stored on the first and second target storage media, the controller controls the second storage to supply the bridging data to the data processing unit during a period in which reading the data stored on the first and second target storage media is discontinuous because of exchange of the first target storage medium for the second target storage medium, so as to present the data stored on the first and second target storage media continuously.

According to the present invention, while data, stored in first and second target storage media, is being presented through a data processor, part of the data is supplied as bridging data by the second storage to the data processor such that the data can be presented continuously even if data reading is discontinued by the exchange of storage media. Thus, data, which is stored on a plurality of storage media, can be continuously presented to the user without making him or her wait for the time required for exchanging the storage media and getting ready to read it out.

In one embodiment of the present invention, the controller controls the first storage and the second storage in such a manner that part of the data, which is to be presented before the bridging data, is read out and supplied to the data processing unit by the first storage, and then the bridging data is supplied to the data processing unit, and then a remaining part of the data stored on the first and second target storage media, which is to be presented after the bridging data, to the data processing unit by the first storage.

In another embodiment of the present invention, the controller controls the first storage to read out part of the data to be presented, which is stored on the first target storage medium, as the bridging data before the data processing unit presents the data stored on the first and second target storage media. When the data processing unit presents the data stored on the first and second target storage media, the controller controls the first storage and the second storage in such a manner that the bridging data is supplied to the data processing unit and then part of the data to be presented, which is stored on the second target storage medium, is supplied to the data processing unit.

In still another embodiment, the controller controls the first storage to read out part of the data to be presented, which is stored on the second target storage medium, as the bridging data before the data processing unit presents the data stored on the first and second target storage media. When the data processing unit presents the data stored on the first and second target storage media, the controller controls the first storage and the second storage in such a manner that part of the data to be presented, which is stored on the first target storage medium, is supplied to the data processing unit, and then the bridging data is supplied to the data processing unit.

In still another embodiment, the controller judges whether or not the bridging data is stored on the second storage before the bridging data is read out and stored on the second storage, and controls the second storage to store the bridging data when the bridging data is not stored on the second storage.

In still another embodiment, the second storage is accessible at a speed equal to or higher than a speed at which the first storage is accessible.

A recording apparatus according to the present invention includes: a first storage including a changer for housing a plurality of storage media and a drive for recording data onto first and second target storage media selected from the storage media in that order; a second storage; a data processing unit for supplying the data to be recorded to one of the first storage and the second storage; and a controller for controlling the first storage, the second storage and the data processing unit. The controller controls the second storage to store part of the data supplied from the data processing unit as bridging data during a period in which recording by the first storage is discontinuous because of exchange of the first target storage medium for the second target storage medium, and controls the first storage and the second storage to store the bridging data onto one of the first and second target storage media by the first storage.

According to the present invention, during an interval in which recording of data on the first storage is discontinued by the exchange of storage media, part of the data supplied from the data processor is temporarily stored as bridging data on the second storage. As a result, it is possible to ensure continuity for the data recording operation. That is to say, even if data should be recorded in real time on a plurality of storage media, that data can be recorded without missing any part of it.

In one embodiment of the present invention, in recording data continuously on first and second target storage media, if the controller has determined that a residual capacity of the first target storage medium is about to reach a predetermined quantity while the data to be recorded is being written on the first target storage medium, then the controller gets the predetermined quantity of the data yet to be recorded written on the second storage as the bridging data. And the controller makes the first storage write the remaining data, except for the bridging data, on the second target storage medium.

In another embodiment, in recording data continuously on first and second target storage media, if the controller has determined that a residual capacity of the first target storage medium is about to reach zero while the data to be recorded is being written on the first target storage medium, then the controller gets a predetermined quantity of the data yet to be recorded written on the second storage as the bridging data, and makes the first storage write the remaining data, except for the bridging data, on the second target storage medium such that the second target storage medium has a residual capacity corresponding to the predetermined quantity.

In still another embodiment, the second storage is accessible at a speed equal to or higher than a speed at which the first storage is accessible.

A recording and reproducing apparatus according to the present invention includes: a first storage including a changer for housing a plurality of storage media and a drive for reading out data from first and second target storage media selected from the storage media in that order; a second storage; a data processing unit for presenting the data stored on the first and second target storage media; and a controller for controlling the changer, the drive, the data processing unit and the second storage. Before the data processing unit starts to present the data stored on the first and second target storage media, the controller judges whether or not the second storage stores at least part of the data stored on one of the first and second target storage media as bridging data, and controls the first storage and the second storage to read out the bridging data from the one of the first and second target storage media and to store the read bridging data when the bridging data is not stored on the second storage. When the data processing unit starts to present the data stored on the first and second target storage media, the controller controls the second storage to supply the bridging data to the data processing unit during a period in which reading the data stored on the first and second target storage media is discontinuous because of exchange of the first target storage medium for the second target storage medium, so as to present the data stored on the first and second target storage media continuously.

BRIEF DESCRIPTION OF THE DRAWINGS

FIG. 2 illustrates an example of on-medium information managed by a disk manager 60 shown in FIG. 1.

DESCRIPTION OF THE PREFERRED EMBODIMENTS

Figure 1:
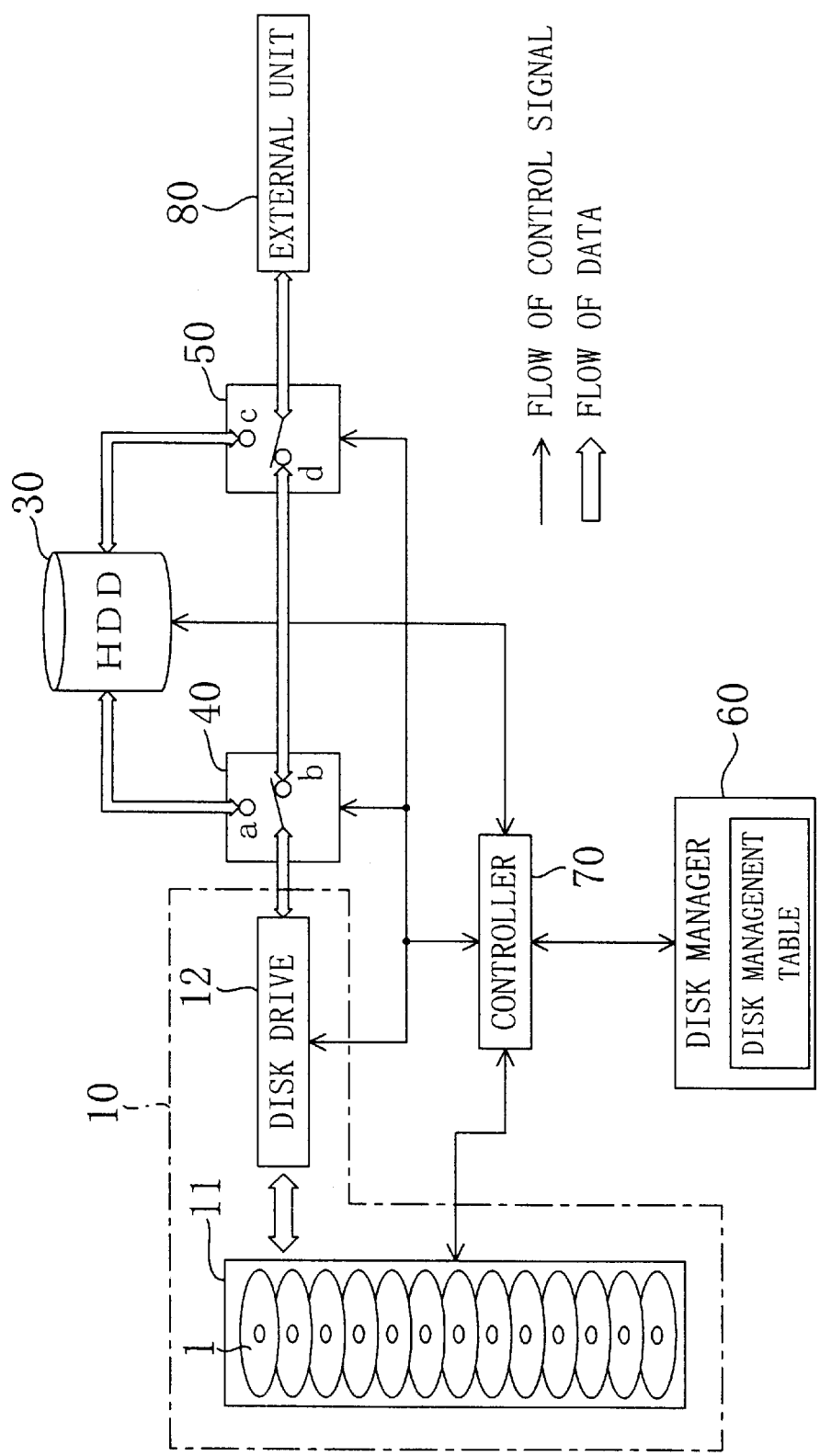
FIG. 1 is a block diagram illustrating a system configuration of a DVD-RAM changer apparatus as an exemplary recording/reproducing apparatus according to the present invention.

FIG. 1 illustrates a system configuration of a DVD-RAM changer apparatus as an exemplary recording/reproducing apparatus according to the present invention. The DVD-RAM changer apparatus can house a plurality of disks (i.e., DVD-RAM disks) 1, as exemplary storage media, in a changer section 10. This apparatus writes data, which has been input from an external unit 80 functioning as a data processing unit, on a target disk 1, or reads out data from a target disk 1 and supplies the read data to the external unit 80. The changer section 10 includes: a disk changer 11 for selecting, as the target disk, one of a plurality of disks 1 housed therein; and a disk drive 12 for writing or reading data on/from the target disk 1 selected by the disk changer 11.

The DVD-RAM changer apparatus shown in FIG. 1 further includes a fixed storage, or a hard disk drive (HDD)

30, as an exemplary internal storage device. The apparatus also includes first and second selectors 40 and 50 for selecting either the changer section 10 or the HDD 30 as the destination on/from which data is written or read out. The apparatus further includes a disk manager 60 for managing on-medium information about respective disks 1 housed in the changer section 10 generally. The on-medium information is stored in the disk manager 60 as a disk management table. And the apparatus is also provided with a controller 70 for controlling the changer section 10, HDD 30 and first and second selectors 40 and 50 by reference to the on-medium information managed by the disk manager 60 and thereby recording and reproducing data. The controller 70 also updates the on-medium information managed by the disk manager 60.

In recording, the external unit 80 may convert the format of video and/or audio data into that adapted to be recorded on an optical disk. In reproducing, the external unit 80 performs signal processing on data, supplied from the changer section 10 (i.e., exemplary first storage) or the HDD 30 (i.e., exemplary second storage) if necessary, and then presents the data processed to the user.

The DVD-RAM changer apparatus shown in FIG. 1 can reproduce data, which is stored on a plurality of disks 1 housed in the disk changer 11, while maintaining complete continuity for the data reproducing operation. Also, this apparatus can also record data, which has been externally supplied, on a plurality of disks 1 housed in the changer section 10, without failing to record any part of the data.

FIG. 2 illustrates an example of the on-medium information managed by the disk manager 60. As shown in FIG. 2, the disk manager 60 manages disk ID's for identifying respective disks 1 and file ID's for identifying respective files stored on each of these disks 1 as the on-medium information using a tree structure. In this embodiment, a file stored on each disk 1 is supposed to be a TV program for the illustrative purpose only. Once data has been recorded on a certain disk 1, the controller 70 updates the on-medium information managed by the disk manager 60.

On each of the disks 1 housed in the disk changer 11, the date and time, when data was recorded on the disk 1 for the first time, are recorded as a disk ID thereof. For example, if data was first recorded on a disk 1 at 23:00:00 on Mar. 10, 1998, then a disk ID "1998-03-10-23-00-00" would be recorded on the disk 1. Also, on each of the disks 1, the date and time when the recording of a program was started and the number of a channel on which the program was broadcast are recorded as a file ID thereof. For instance, if the recording of a program was started at 23:00:00 on Mar. 10, 1998 and the channel number was "1", then a file ID "1998-03-10-23-00-00-01" would be recorded on the disk 1.

Furthermore, if a single program was recorded on a plurality of disks 1, then an ordinal number representing the order of recording is appended as a sub-ID to each file ID. For example, if the recording of a program broadcast on channel No. 1 was started at 20:00:00 on Mar. 15, 1998 and if the program was recorded on a plurality of disks 1, then file ID's "1998-03-15-20-00-00-01-01" and "1998-03-15-20-00-00-01-02" would be recorded on the first and second disks 1, respectively.

Suppose a disk 1 has been newly inserted into the disk changer 11. Then, the controller 70 controls the disk drive 12 to read the disk ID and file ID's from the disk 1. Next, the controller 70 has the disk ID and file ID's newly managed by the disk manager 60 as new pieces of on-medium information. Also, if a disk 1 has been ejected from the disk changer 11, the controller 70 controls the disk drive 12 to write the disk ID and the file ID's thereof, managed by the disk manager 60, onto the disk 1.

Furthermore, the disk manager 60 also manages the size of a recordable area on each disk 1 as another piece of the on-medium information.

Data Recording Operation

Hereinafter, exemplary data recording operations performed by the DVD-RAM disk changer apparatus shown in FIG. 1 will be described. In this case, the apparatus shown in FIG. 1 operates as a recording apparatus of the present invention.

(First exemplary operation)

Figure 3:
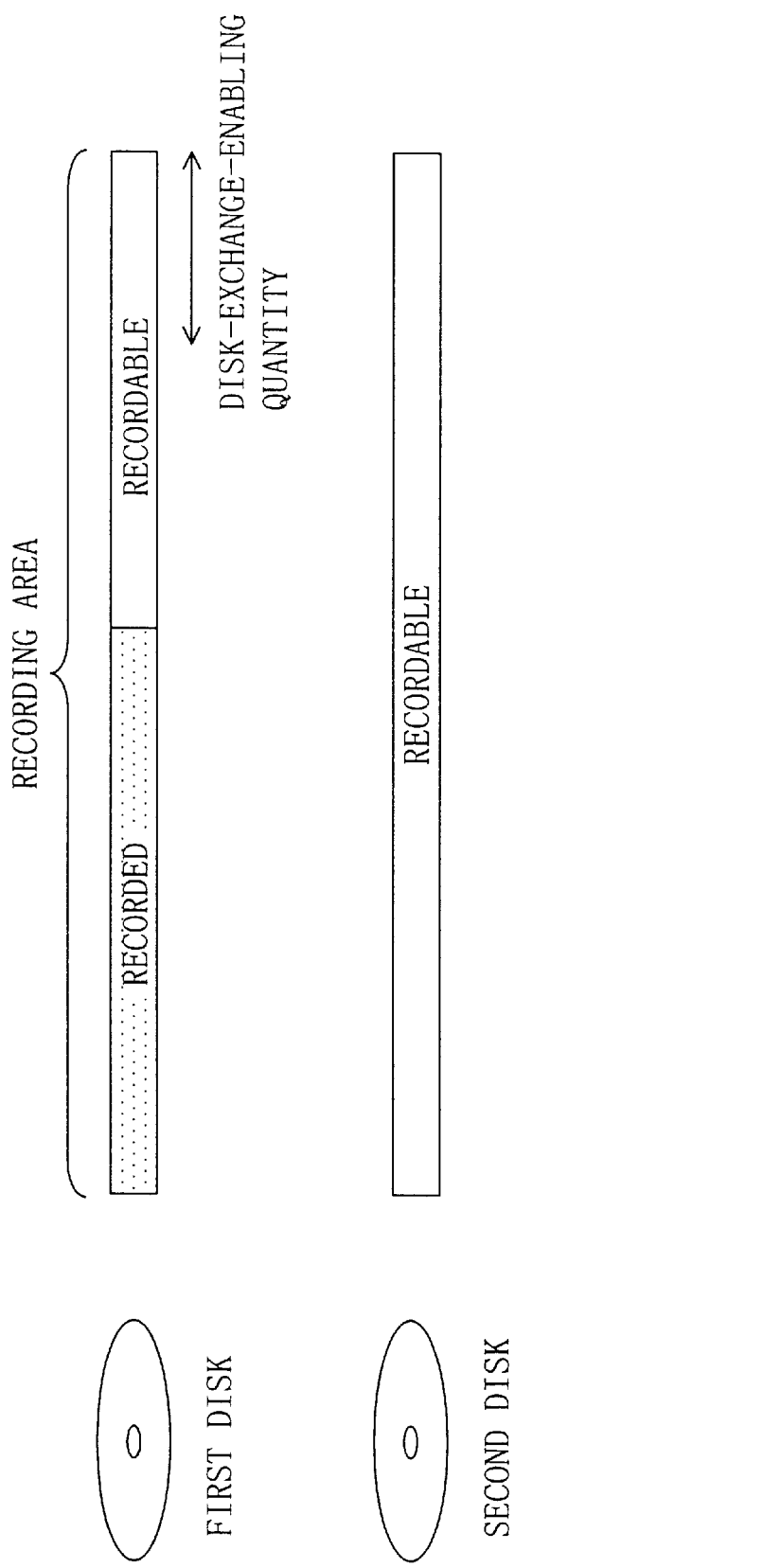
FIG. 3 illustrates recorded and recordable areas of first and second disks, selected as respective targets on which data should be written, before a first exemplary data recording operation is started.

FIG. 3 illustrates recorded and recordable areas of first and second disks, selected as respective targets on which data should be written, before the data recording operation is started. In FIG. 3, recording areas of the first and second disks are shown on the right as respective bands each including recorded and/or recordable area(s). As shown in FIG. 3, part of the recording area has already been recorded on the first disk, whereas the recording area on the second disk is entirely recordable. In this case, a disk having a recordable area, which can afford to record a certain quantity of data supplied from the external unit 80 during a time required for the disk changer 11 to exchange disks 1 and for the disk drive 12 to get ready to write data thereon, is selected as the first disk. In this specification, such a quantity will be called a "disk-exchange-enabling quantity".

The "disk-exchange-enabling quantity" is determined depending on the disk exchange performance of the disk changer 11 and the speed at which data is supplied from the external unit 80. Suppose the longest time required for exchanging disks is T (s) and data is supplied from the external unit 80 at m (Mbps). Then, the disk-exchange-enabling quantity is mT (Mbit).

First, the controller 70 instructs the disk drive 12 of the changer section 10 to write data on the first disk. At the start of the data recording, the first and second selectors 40 and 50 are connected to terminals b and d, respectively. That is to say, the data to be recorded, supplied from the external unit 80, is provided to the disk drive 12 of the changer section 10, thereby starting to write the data onto the first disk.

Referring to the on-medium information, managed by the disk manager 60, the size of the recordable area on the first disk before the data recording is started can be known. Also, the quantity of data already recorded can be detected from the operation of the disk drive 12. Thus, when the controller 70 judges that the size of the residual recordable area on the first disk has almost reached the disk-exchange-enabling quantity, the controller 70 turns the second selector 50 to a terminal c. As a result, the data supplied from the external unit 80 starts to be input to the HDD 30, and data of a quantity equal to the disk-exchange-enabling quantity is recorded on the HDD 30 as bridging data.

After the controller 70 has turned the second selector 50 to the terminal c, the controller 70 instructs the disk changer 11 to exchange the first disk for the second disk. And after the disk changer 11 has exchanged the disks and the disk drive 12 is ready to write data on the second disk, the changer section 10 notifies the controller 70 of that and enters a waiting state. In response to the notification that the changer section 10 gets ready to write data on the second disk, the controller 70 waits for a notification from the HDD 30. Once the HDD 30 has recorded the bridging data, the HDD 30 notifies the controller 70 of that. In response to the notification, reporting the completion of bridging data recording, from the HDD 30, the controller 70 turns the second selector 50 to the terminal d and instructs the disk drive 12 to start to write data on the second disk. In this manner, no sooner has the bridging data been recorded than writing data on the second disk can be started without any discontinuity.

After all of the data to be written has been recorded, the controller 70 instructs the disk changer 11 to exchange the second disk for the first disk and turns the first selector 40 to the terminal a. As a result, the bridging data, which was written on the HDD 30 during the disk exchange, is written onto the residual recordable area on the first disk.

Figure 4:
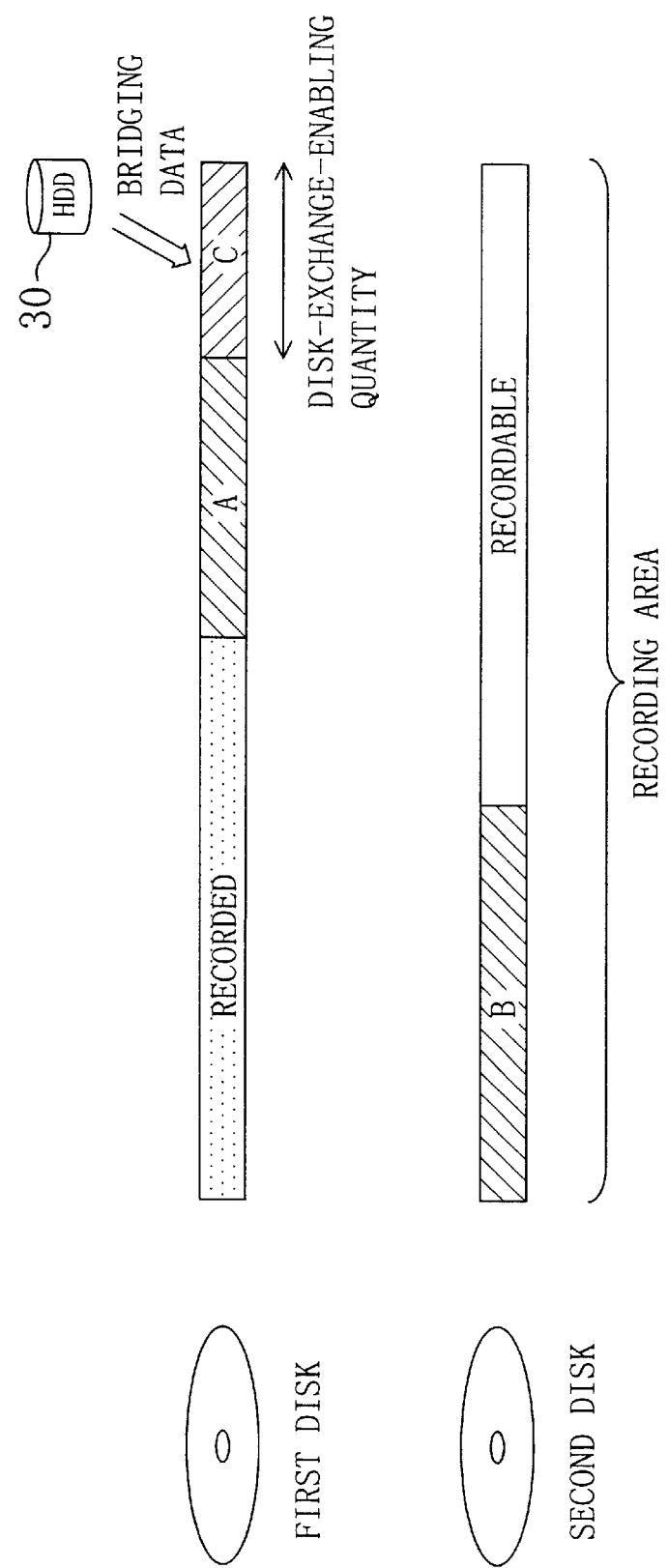
FIG. 4 illustrates respective recorded areas of the first and second disks shown in FIG. 3 after the first data recording operation has been performed.

FIG. 4 illustrates respective recorded areas on the first and second disks after the data recording operation has been completed. As shown in FIG. 4, data is first written on an area A of the first disk, data to be written next onto an area C is temporarily written on the HDD 30 and then data is written on an area B of the second disk. The bridging data, which was recorded on the HDD 30 during the disk exchange, is written on the remaining area C of the first disk after the data recording operation has been once finished.

By performing these operations, the data supplied from the external unit 80 can be recorded on a plurality of disks without failing to record any part of the data, even if the data should be recorded in real time.

(Second exemplary operation)

In the second exemplary operation, data is continuously written on the first disk until no recordable area is left, and the bridging data, temporarily recorded on the HDD 30, is written on the second disk after the data recording operation has been once finished.

Figure 5:
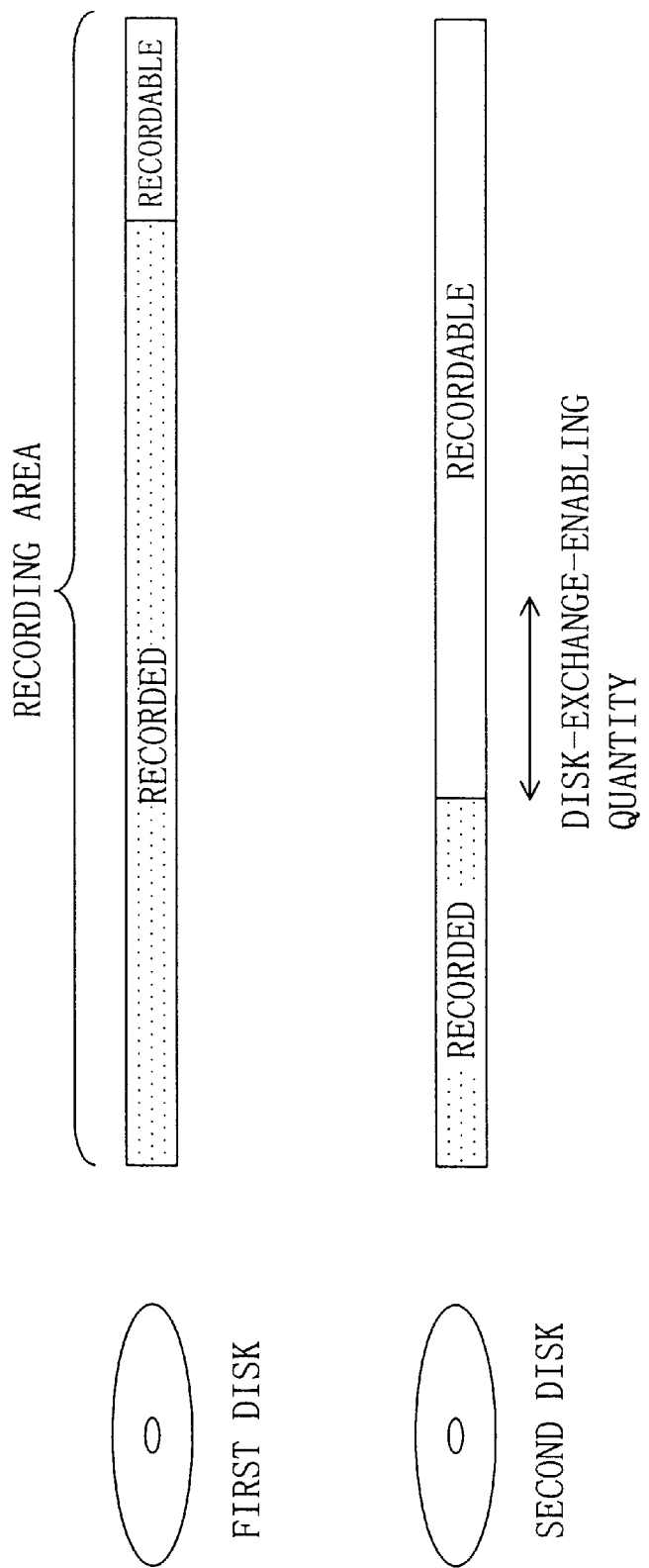
FIG. 5 illustrates recorded and recordable areas of first and second disks, selected as respective targets on which data should be written, before a second exemplary data recording operation is started.

FIG. 5 illustrates recorded and recordable areas of first and second disks, selected as respective targets on which data should be written, before the data recording operation is started. As shown in FIG. 5, respective parts of the recording areas have already been recorded on both the first and second disks. Also, in this example, a disk having a recordable area, the size of which is much greater than the disk-exchange-enabling quantity, is selected as the second disk.

First, the controller 70 instructs the disk drive 12 of the changer section 10 to write data on the first disk. At the start of the data recording, the first and second selectors 40 and 50 are connected to the terminals b and d, respectively. That is to say, the data to be recorded, supplied from the external unit 80, is provided to the disk drive 12 of the changer section 10, thereby starting to write the data onto the first disk.

When the controller 70 judges that the residual recordable area on the first disk has almost reached zero, the controller 70 turns the second selector 50 to the terminal c. As a result, the data supplied from the external unit 80 starts to be input to the HDD 30, and data of a quantity equal to the disk-exchange-enabling quantity is recorded on the HDD 30 as bridging data.

After the controller 70 has turned the second selector 50 to the terminal c, the controller 70 instructs the disk changer 11 of the changer section 10 to exchange the first disk for the second disk. And after the disk changer 11 has exchanged the disks, sought a portion on which the bridging data will be subsequently recorded and entered a recording waiting state, the changer section 10 notifies the controller 70 of that. In response to the notification that the disk changer 11 has exchanged the disks, the controller 70 waits for a notification that the HDD 30 has recorded the bridging data. When the controller 70 receives a notification that the HDD 30 has recorded the bridging data, the controller 70 turns the second selector 50 to the terminal d. As a result, writing data onto the second disk is started.

Once the data has been written on the second disk, the controller 70 turns the first selector 40 to the terminal a. As a result, the bridging data, which was written on the HDD 30 during the disk exchange, is written onto a predetermined portion of the residual recordable area on the second disk.

By performing these operations, the data supplied from the external unit 80 can be recorded on a plurality of disks without failing to record any part of the data, even if the data should be recorded in real time.

Figure 6:
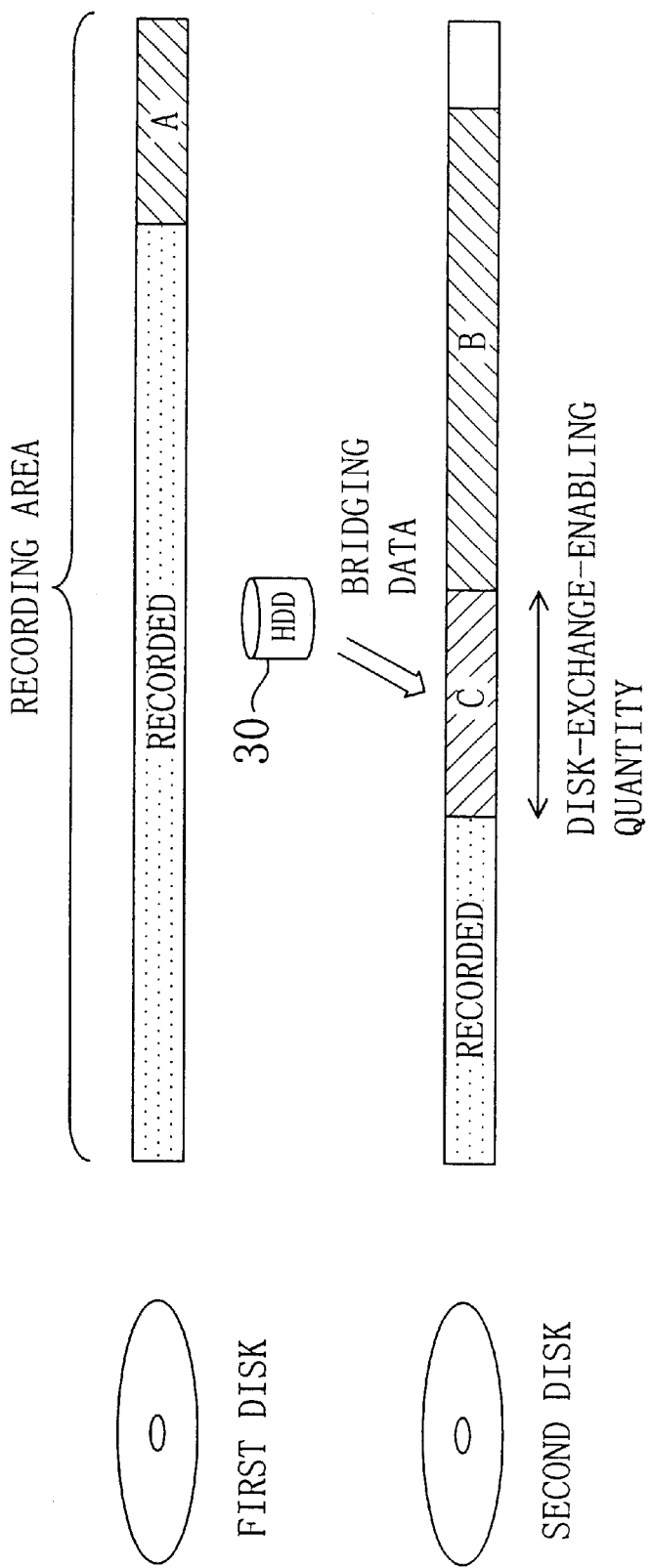
FIG. 6 illustrates respective recorded areas of the first and second disks shown in FIG. 5 after the second data recording operation has been performed.

FIG. 6 illustrates respective recorded areas of the first and second disks after the data recording operation has been finished. As shown in FIG. 6, data is first written on an area A of the first disk, data to be written next onto an area C is temporarily recorded on the HDD 30 and then data is written on an area B of the second disk. The bridging data, which was recorded on the HDD 30 during the disk exchange, is recorded on the area C of the second disk after the data recording operation has been once finished.

In the first and second exemplary data recording operations described above, data is supposed to be recorded on two disks. However, the present invention is naturally applicable to recording data on three or more disks. It should be noted that in recording data on three or more disks, the first and second exemplary operations may be performed in combination if necessary.

Furthermore, the selection of a next disk may be postponed until the residual recordable area on a disk, on which data is now being written, is about to reach the disk-exchange-enabling quantity or zero, instead of selecting a plurality of disks in advance.

Moreover, the bridging data need not be physically continuous on an optical disk with data to be read out immediately before or after the bridging data has been read out. This is because the data recorded can be read out continuously by seeking a disk so long as the addresses of the bridging data and other data are known. It should be noted that the disk drive 12 includes a memory functioning as a buffer. Accordingly, seek time between the reproduction of the bridging data and that of other data can be absorbed by this memory.

Data Reproducing Operation

Next, exemplary data reproducing operations performed by the DVD-RAM changer apparatus shown in FIG. 1 will be described. In this case, the apparatus shown in FIG. 1 operates as a reproducing apparatus according to the present invention.

(First exemplary operation)

In response to a data reproduction request, the controller 70 searches for a target disk through the disk management table based on the file ID of the data to be reproduced, thereby judging whether or not the data to be reproduced is stored on a plurality of disks. In this case, the data to be reproduced is supposed to be stored on two disks.

Figure 7:
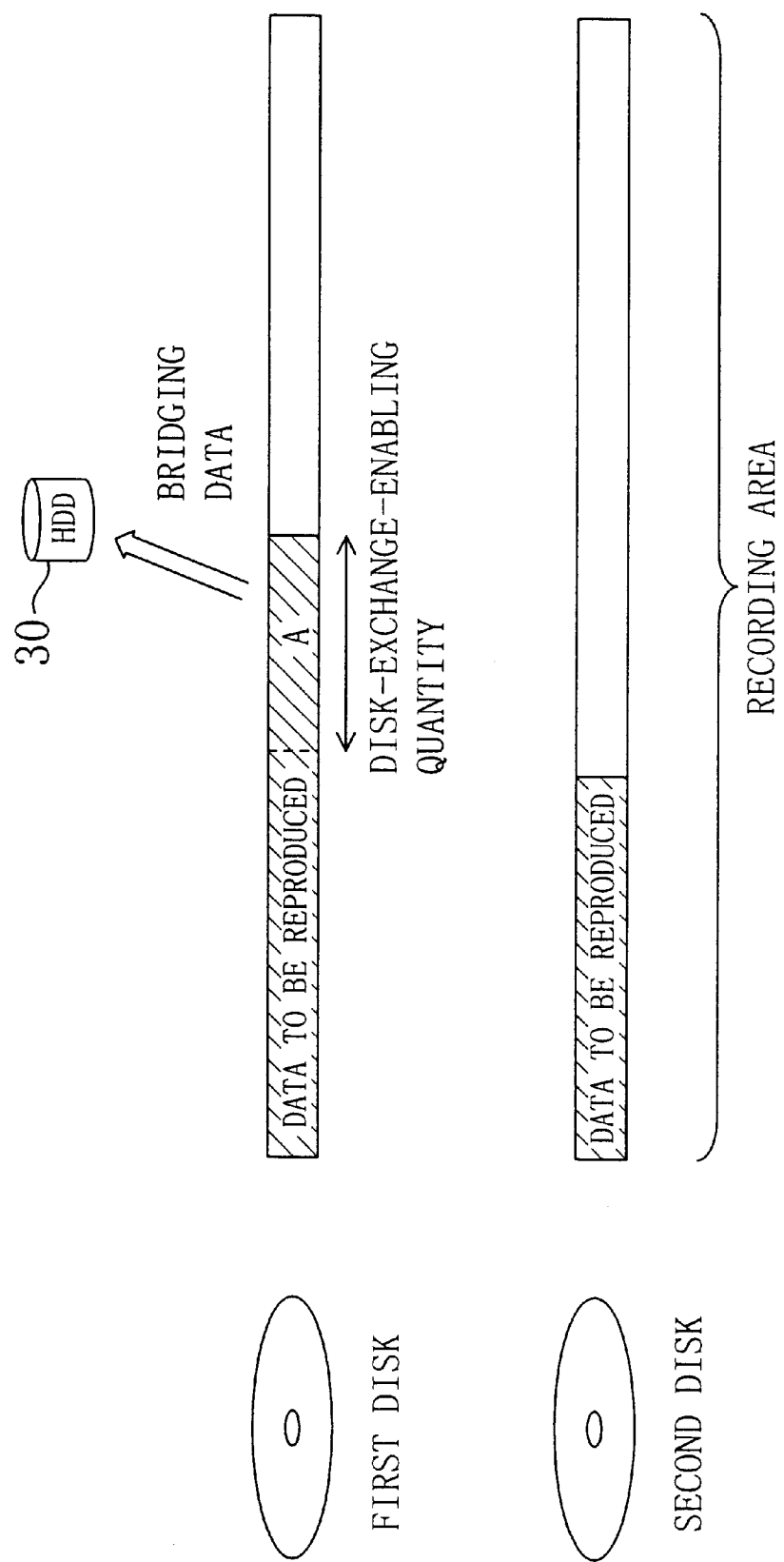
FIG. 7 illustrates respective reproducible areas of first and second disks, selected as respective targets from which data should be read out, in a first exemplary data reproducing operation.

FIG. 7 illustrates respective reproducible areas on first and second disks, selected as respective targets from which data should be read out, in this exemplary operation. Before starting to present the read data to the user via the external unit 80, the controller 70 turns the first selector 40 to the terminal a, and instructs the disk drive 12 to read out predetermined data (stored on the area A in FIG. 7) from the first disk. On the area A, a quantity of data, which is equal to that of the data consumed by the external unit 80 during a time required for exchanging disks and getting ready to read out data therefrom, i.e., the disk-exchange-enabling quantity, is stored. And this data is stored as the bridging data on the HDD 30. In this case, the disk drive 12 notifies the controller 70 of the position at which the area A begins. In response thereto, the controller 70 records the position on the disk management table.

The "disk-exchange-enabling quantity" is determined depending on the disk exchange performance of the disk changer 11 and the speed at which data is consumed by the external unit 80. Suppose the longest time required for exchanging disks and getting ready to read out data is T (s) and the data is consumed by the external unit 80 at m (Mbps). Then, the disk-exchange-enabling quantity is mT (Mbit).

After the bridging data has been recorded on the HDD 30, the controller 70 turns the first selector 40 to the terminal b. Then, the controller 70 instructs the disk drive 12 of the changer section 10 to start to read out the data from the first disk, thereby starting the data reproducing operation.

Having detected that data has been read out from the first disk until the beginning of the area A, the controller 70 turns the second selector 50 to the terminal c. And the controller 70 instructs the HDD 30 to read out the bridging data and the disk changer 11 to exchange the first disk for the second disk. In this manner, the bridging data can be continuously supplied to the external unit 80 as soon as the data, read out from the first disk, has been supplied to the external unit 80 and in parallel to the disk exchange performed by the disk changer 11.

When the disk drive 12 is ready to read out data from the second disk, the disk drive 12 notifies the controller 70 of that and enters the waiting state. In response to the notification that the disk drive 12 gets ready to read out data from the second disk, the controller 70 waits for a notification from the HDD 30. Once the HDD 30 has supplied the bridging data to the external unit 80, the HDD 30 notifies the controller 70 of that. In response to the notification, reporting that the bridging data has been supplied to the external unit 80, from the HDD 30, the controller 70 turns the second selector 50 to the terminal d and instructs the waiting disk drive 12 to start to read out data from the second disk. In this manner, no sooner has the bridging data been supplied to the external unit 80 than reading data from the second disk can be started without any discontinuity.

By performing these operations, the data recorded on a plurality of disks can be continuously reproduced on the external unit 80, i.e., continuously presented to the user by the external unit 80, without making the user wait during the disk exchange.

(Second exemplary operation)

In this second exemplary operation, part of the data to be reproduced, which is stored on the second disk, is copied as the bridging data on the HDD 30 before data reproducing operation is started.

Figure 8:
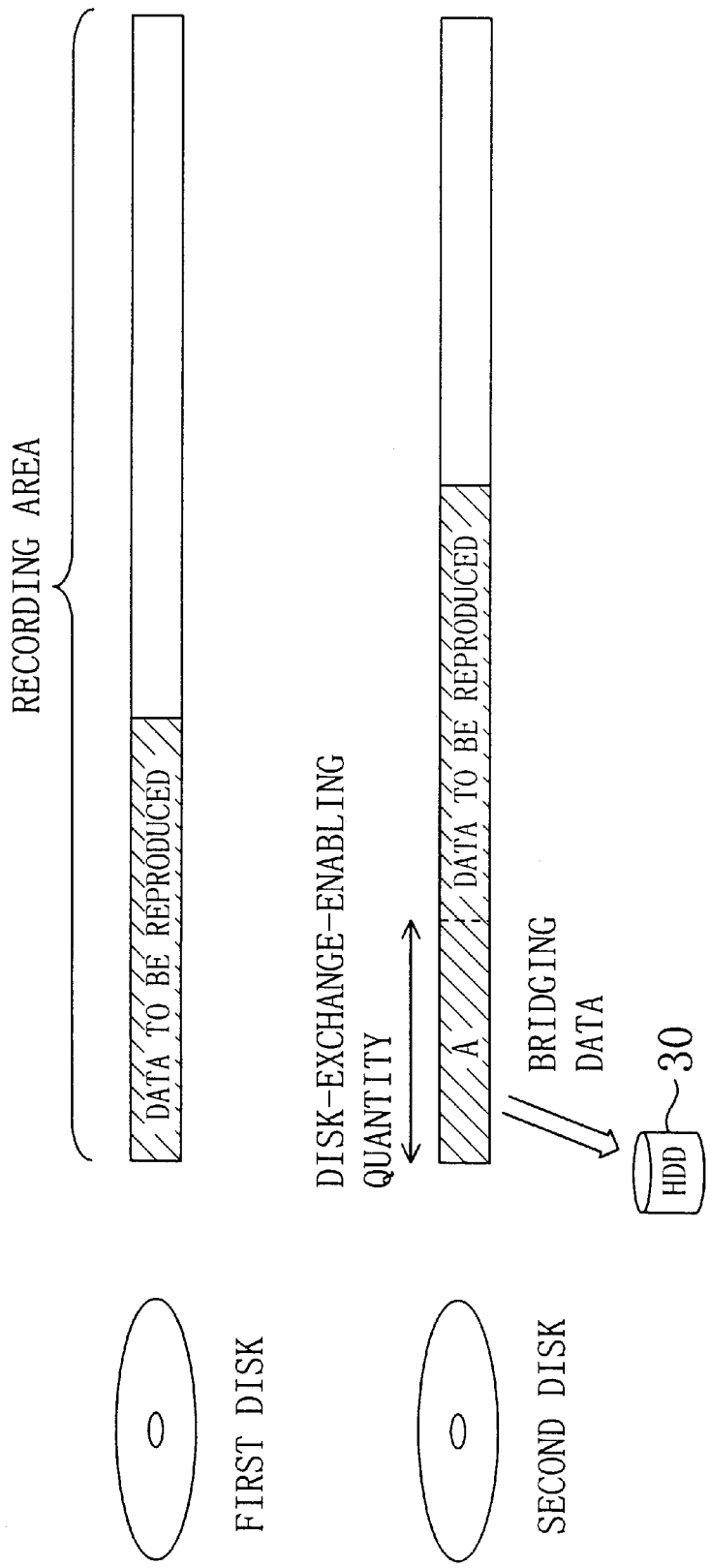
FIG. 8 illustrates respective areas of first and second disks, selected as respective targets from which data should be read out, in a second exemplary data reproducing operation.

FIG. 8 illustrates respective reproducible areas of first and second disks, selected as target disks from which data should be read out, in this exemplary operation. Before starting to present the read data to the user via the external unit 80, the controller 70 turns the first selector 40 to the terminal a, and instructs the disk drive 12 to read out predetermined data (stored on the area A in FIG. 8) from the second disk. On the area A, a quantity of data, which is equal to the disk-exchange-enabling quantity, is stored. And this data is stored as the bridging data on the HDD 30. In this case, the disk drive 12 notifies the controller 70 of the position at which the area A ends. In response thereto, the controller 70 records the end position on the disk management table in the disk manager 60.

After the bridging data has been copied on the HDD 30, the controller 70 instructs the disk changer 11 to exchange the second disk for the first disk and turns the first selector 40 to the terminal b. When data is ready to be read out after the disks have been exchanged, the disk drive 12 notifies the controller 70 of that. In response to the notification that the disk drive 12 is ready to read out the data from the first disk, the controller 70 instructs the disk drive 12 to start to read out the data from the first disk, thereby starting the data reproducing operation. The data, which has been read out from the first disk, is supplied to the external unit 80. In response thereto, the external unit 80 processes the data and presents the data to the user.

Having detected that the disk drive 12 has read out the entire data from the first disk, the controller 70 turns the second selector 50 to the terminal c. Then, the controller 70 instructs the HDD 30 to read out the bridging data and the disk changer 11 to exchange the first disk for the second disk. In this manner, the bridging data can be continuously supplied to the external unit 80 as soon as the data, read out from the first disk, has been supplied to the external unit 80 and in parallel to the disk exchange performed by the disk changer 11.

When the disk drive 12 gets ready to read out data from the second disk, the disk drive 12 notifies the controller 70 of that and enters a waiting state. In response to the notification that the disk drive 12 is ready to read out data from the second disk, the controller 70 waits for a notification from the HDD 30. Once the HDD 30 has supplied the bridging data to the external unit 80, the HDD 30 notifies the controller 70 of that. In response to the notification, reporting that the bridging data has been transferred to the external unit 80, from the HDD 30, the controller 70 turns the second selector 50 to the terminal d and instructs the waiting disk drive 12 to start to read out data from the second disk. In this case, the end position of the area A is supplied to the disk drive 12 as a position at which data reading should be started. In this manner, no sooner has the bridging data been supplied to the external unit 80 than reading data from the second disk can be started without any discontinuity. As a result, data can be supplied to the external unit 80 seamlessly, which can present the data to the user continuously.

By performing these operations, the data stored on a plurality of disks can be continuously reproduced on the external unit 80, i.e., continuously presented to the user by the external unit 80, without making the user wait during the disk exchange. In this example, the end point of the area A is once recorded on the disk management table. Alternatively, the end point may be memorized by the controller 70 without recording it.

In the first and second exemplary data reproducing operations described above, data is supposed to be read out from two disks. However, the present invention is naturally applicable to reproducing data stored in three or more disks. For example, in reproducing data stored in a number n of disks, respective data, each having a quantity equal to the disk-exchange-enabling quantity, may be read out from the first to the $(n-1)^{th}$ disk and then stored on the HDD 30 before the reproduction of data is started. Also, in reproducing data stored in three or more disks, the first and second exemplary operations may be performed in combination if necessary.

Figure 9:
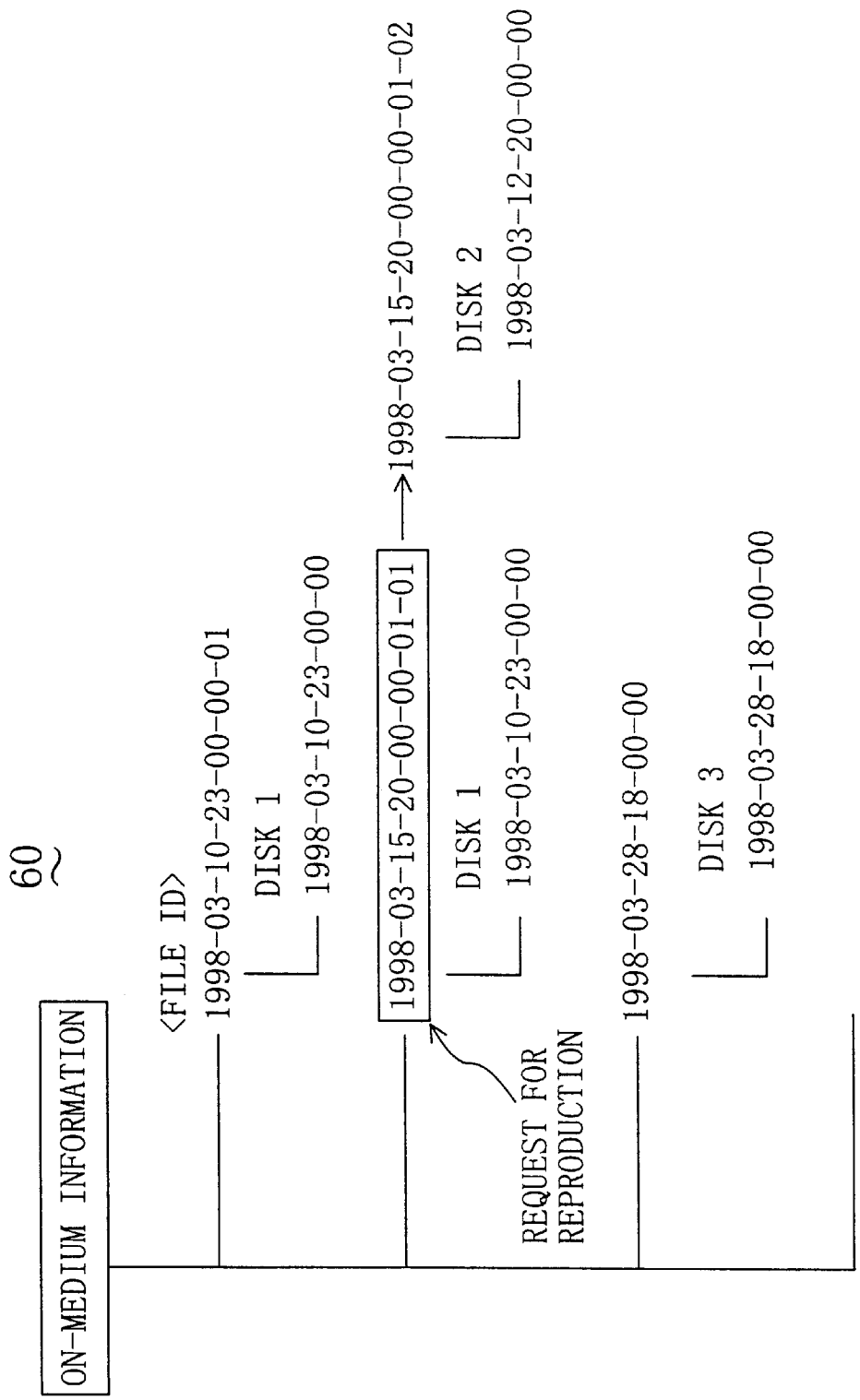
FIG. 9 illustrates rearranged version of the on-medium information shown in FIG. 2.

In both of the first and second exemplary operations, a disk, on which data to be reproduced is stored, may be selected in the following manner. The controller 70 rearranges the disk management table based on the specified file ID's and searches for the target disks in accordance with the rearranged disk management table. FIG. 9 illustrates a rearranged version of the disk management table shown in FIG. 2 where "1998-03-15-20-00-00-01" has been specified as a file ID. Optionally, it is naturally possible to search through the entire data structure shown in FIG. 2 without carrying out the rearrangement.

(Third exemplary operation)

In the third exemplary operation, if there is any disk, having a quantity of data to be reproduced smaller than the disk-exchange-enabling quantity, then the data stored on such a disk is entirely copied on the HDD 30 as the bridging data before the data reproducing operation is started. In this manner, reading the data from the disk is omitted during the data reproducing operation.

In response to a data reproduction request, the controller 70 consults the disk management table as in the first or second exemplary operation, thereby specifying at least one disk on which data to be reproduced is stored. If the controller 70 has judged that the data to be reproduced is stored on a plurality of disks, then the controller 70 consults the disk management table again to see if there is any disk, having a quantity of data smaller than the disk-exchange-enabling quantity, among the targets.

If there is any such disk, then the controller 70 gets the entire data, stored on the disk in question, copied on the HDD 30 before the data reproducing operation is started. Specifically, the controller 70 turns the first selector 40 to the terminal a and instructs the disk drive 12 of the changer section 10 to read out the data from the disk. Having copied the data on the HDD 30, the controller 70 controls the disk changer 11 to exchange disks.

After that, the controller 70 starts the data reproducing operation. However, the disk drive 12 does not read out the data, which has been copied to the HDD 30, from the disk in question. Instead, the data is transferred from the HDD 30 to the external unit 80 and presented to the user.

(Fourth exemplary operation)

According to the present invention, the bridging data, which was recorded on the HDD 30 during the data recording operation, is not erased but saved. Thus, in reproducing data using the apparatus used for recording the data, the bridging data, used during recording, may also be used as bridging data during reproduction. In such a case, the processing step of copying data, having a quantity equal to the disk-exchange-enabling quantity, onto the HDD 30 as bridging data for reproduction before the start of the data reproducing operation can be omitted. As a result, a time after a request to reproduce data has been received from the user and before the external unit 80 starts to present the data can be shortened. In this example, the DVD-RAM changer apparatus shown in FIG. 1 operates as a recording/reproducing apparatus according to the present invention.

In recording data, the DVD-RAM changer apparatus shown in FIG. 1 operates as in the first and second exemplary data recording operations described above. In this case, the controller 70 records the position, at which the bridging data starts to be recorded on the HDD 30, on the disk management table stored in the disk manager 60 such that the position can be searched for based on the file ID's.

Figure 10:
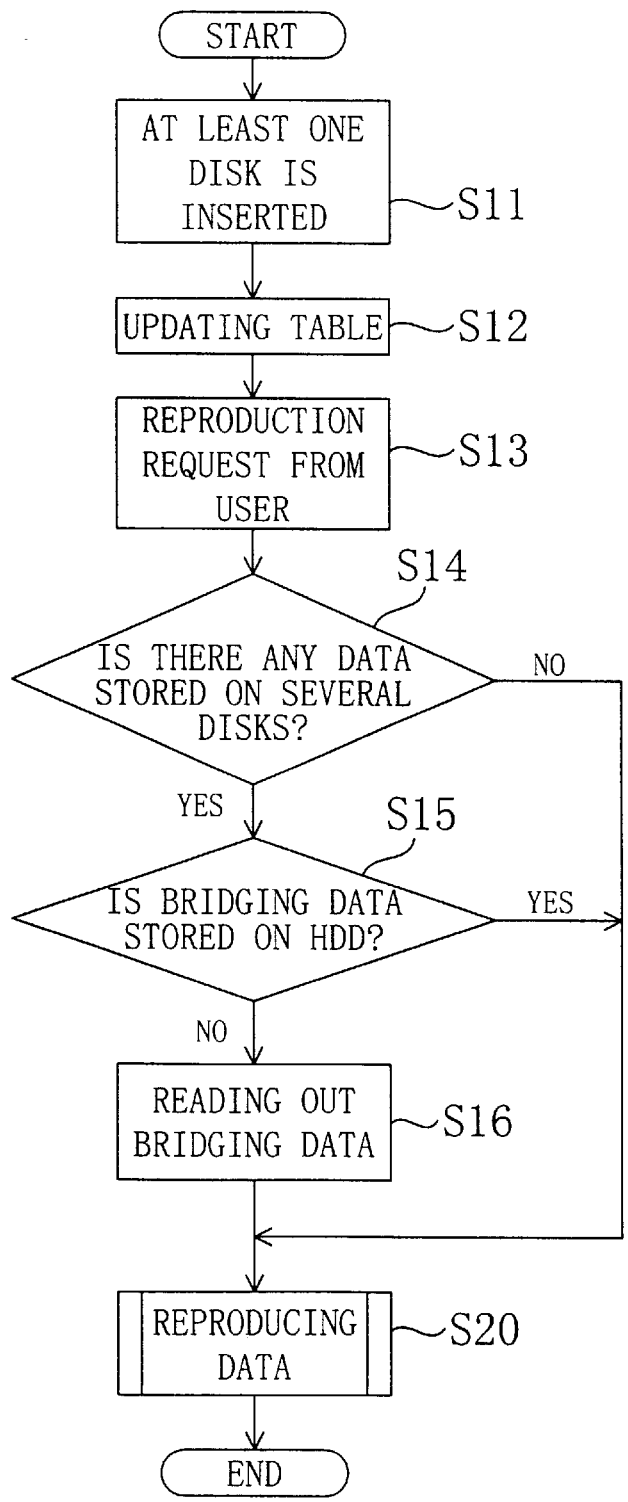
FIG. 10 is a flowchart illustrating the processing flow of a fourth exemplary data reproducing operation.

FIG. 10 illustrates the processing flow of this exemplary data reproducing operation. First, in Step S11, at least one disk is inserted into the disk changer 11. In response thereto, the controller 70 controls the disk drive 12 to read out the on-medium information, including the disk ID and file ID's, of the disk inserted, and then updates the contents of the disk management table in the disk manager 60 using this information in Step S12. Processing up to this point may be performed either just after the disk has been inserted or after a reproduction request has been received from the user. In this example, this processing is supposed to be performed just after the disk has been inserted.

In response to the reproduction request from the user in Step S13, the controller 70 consults the disk management table to specify at least one disk on which data to be reproduced is stored. Then, in Step S14, the controller 70 consults the disk management table to judge whether or not there is any data stored on a plurality of disks.

If the answer to the inquiry in Step S14 is "YES", then the controller 70 judges in Step S15 whether or not the bridging data for this data is stored on the HDD 30. So long as this data has been recorded by the apparatus shown in FIG. 1, the bridging data for this data must have been stored on the HDD 30. However, should the bridging data be absent from the HDD 30, the bridging data is recorded on the HDD 30 before the data reproducing operation is started as in the first through third exemplary operations described above. It should be noted that Step S14 may be omitted or may be performed just after the disk has been inserted continuously with Step S12. In this exemplary operation, the table is supposed to be updated in Step S12 just after the disk has been inserted. Alternatively, the table may be updated just after the apparatus has been powered, for example.

Also, the bridging data, written on the HDD 30 during the data reproduction, may be saved and reused when reproduction of the same data is requested again later, instead of erasing it.

In the foregoing embodiments, the date and time when data was initially recorded on a disk are used as a disk ID, and the date and time when the recording of a program was started and the number of a channel on which the program was broadcast are used as a file ID. Alternatively, any other data may be used as the disk ID and file ID.

Also, in the foregoing embodiments, the present invention has been described as being applied to a DVD-RAM changer apparatus using a DVD-RAM disk as an exemplary storage medium. However, the present invention is naturally applicable to any recording/reproducing apparatus using any other storage medium. Moreover, a hard disk drive is supposed to be used as second storage on which bridging data should be recorded. It is of course possible to use any other storage medium. Also, the second storage is preferably accessible at a speed equal to or higher than a speed at which first storage is accessible.

Furthermore, the present invention is also applicable to a recording/reproducing apparatus using a storage medium like an LD, both sides of which are usable for recording and reproduction. This is because each side of such a double-sided disk is equivalent to one single-sided disk.

As is apparent from the foregoing description, in reproducing data stored on a plurality of storage media, bridging data is copied beforehand onto a second storage. And after the presentation of data to the user has been actually started and while data reading from a disk is discontinued during the disk exchange, the data stored in the second storage is read out. Thus, the data, stored on a plurality of storage media, can be continuously presented to the user without making the user wait for a time required for exchanging disks and getting ready to read out data therefrom.

In addition, in recording data on a plurality of storage media, bridging data, which is part of the data to be recorded, is temporarily written into the second storage. Thus, it is possible to ensure continuity for a data recording operation. That is to say, even if data should be recorded in real time, e.g., on a plurality of media separately, the data can be recorded without failing to record any part of it.

What is claimed is:

1. A reproducing apparatus comprising:

a first storage including a changer for housing a plurality of storage media and a drive for reading out data from first and second target storage media selected from the storage media in that order;

a second storage;

a data processing unit for presenting the data stored on the first and second target storage media; and a controller for controlling the changer, the drive, the data processing unit and the second storage, wherein, before the data processing unit starts to present the data stored on the first and second target storage media, the controller controls the first storage to read out at least part of the data stored on one of the first and second target storage media as bridging data and controls the second storage to store the read bridging data, and wherein, when the data processing unit starts to present the data stored on the first and second target storage media, the controller controls the second storage to supply the bridging data to the data processing unit during a period in which reading the data stored on the first and second target storage media is discontinuous because of exchange of the first target storage medium for the second target storage medium, so as to present the data stored on the first and second target storage media continuously.

2. A reproducing apparatus according to claim 1, wherein the controller controls the first storage and the second storage in such a manner that part of the data, which is to be presented before the bridging data, is read out and supplied to the data processing unit by the first storage, and then the bridging data is supplied to the data processing unit, and then a remaining part of the data stored on the first and second target storage media, which is to be presented after the bridging data, to the data processing unit by the first storage.

3. A reproducing apparatus according to claim 1, wherein the controller controls the first storage to read out part of the data to be presented, which is stored on the first target storage medium, as the bridging data before the data processing unit presents the data stored on the first and second target storage media, and wherein, when the data processing unit presents the data stored on the first and second target storage media, the controller controls the first storage and the second storage in such a manner that the bridging data is supplied to the data processing unit and then part of the data to be presented, which is stored on the second target storage medium, is supplied to the data processing unit.

4. A reproducing apparatus according to claim 1, wherein the controller controls the first storage to read out part of the data to be presented, which is stored on the second target storage medium, as the bridging data before the data processing unit presents the data stored on the first and second target storage media, and wherein, when the data processing unit presents the data stored on the first and second target storage media, the controller controls the first storage and the second storage in such a manner that part of the data to be presented, which is stored on the first target storage medium, is supplied to the data processing unit, and then the bridging data is supplied to the data processing unit.

5. A reproducing apparatus according to claim 1, wherein the controller judges whether or not the bridging data is stored on the second storage before the bridging data is read out and stored on the second storage, and wherein the controller controls the second storage to store the bridging data when the bridging data is not stored on the second storage.

6. A reproducing apparatus according to claim 1, wherein the second storage is accessible at a speed equal to or higher than a speed at which the first storage is accessible.

7. A recording apparatus comprising:

a first storage including a changer for housing a plurality of storage media and a drive for recording data onto first and second target storage media selected from the storage media in that order;

a second storage;

a data processing unit for supplying the data to be recorded to one of the first storage and the second storage; and a controller for controlling the first storage, the second storage and the data processing unit, wherein the controller controls the second storage to store part of the data supplied from the data processing unit as bridging data during a period in which recording by the first storage is discontinuous because of exchange of the first target storage medium for the second target storage medium, and controls the first storage and the second storage to store the bridging data onto one of the first and second target storage media by the first storage.

8. A recording apparatus according to claim 7, wherein in recording data continuously on first and second target storage media, if the controller has determined that a residual capacity of the first target storage medium is about to reach a predetermined quantity while the data to be recorded is being written on the first target storage medium, then the controller gets the predetermined quantity of the data yet to be recorded written on the second storage as the bridging data, and makes the first storage write the remaining data, except for the bridging data, on the second target storage medium.

9. A recording apparatus according to claim 7, wherein in recording data continuously on first and second target storage media, if the controller has determined that a residual capacity of the first target storage medium is about to reach zero while the data to be recorded is being written on the first target storage medium, then the controller gets a predetermined quantity of the data yet to be recorded written on the second storage as the bridging data, and makes the first storage write the remaining data, except for the bridging data, on the second target storage medium such that the second target storage medium has a residual capacity corresponding to the predetermined quantity.

10. A recording apparatus according to claim 7, wherein the second storage is accessible at a speed equal to or higher than a speed at which the first storage is accessible.

11. A recording and reproducing apparatus comprising:

a first storage including a changer for housing a plurality of storage media and a drive for reading out data from first and second target storage media selected from the storage media in that order;

a second storage;

a data processing unit for presenting the data stored on the first and second target storage media; and a controller for controlling the changer, the drive, the data processing unit and the second storage, wherein, before the data processing unit starts to present the data stored on the first and second target storage media, the controller judges whether or not the second storage stores at least part of the data stored on one of the first and second target storage media as bridging data, and controls the first storage and the second storage to read out the bridging data from the one of the first and second target storage media and to store the read bridging data when the bridging data is not stored on the second storage, and wherein, when the data processing unit starts to present the data stored on the first and second target storage media, the controller controls the second storage to supply the bridging data to the data processing unit during a period in which reading the data stored on the first and second target storage media is discontinuous because of exchange of the first target storage medium for the second target storage medium, so as to present the data stored on the first and second target storage media continuously.

* * * * *